United States Patent [19]
Levy et al.

[11] Patent Number: 5,652,779
[45] Date of Patent: Jul. 29, 1997

[54] FILM POSITIONING SYSTEM FOR DENTAL X-RAY PROCEDURES

[75] Inventors: Paul Levy, 6 Baxter Cir., Burlington, Mass. 01803; Steven Caney, Center Harbor, N.H.; Francis X. Hines, Jr., Lynnfield, Mass.

[73] Assignee: Paul Levy, Burlington, Mass.

[21] Appl. No.: 523,085

[22] Filed: Sep. 1, 1995

[51] Int. Cl.⁶ .................................................. G03B 42/02
[52] U.S. Cl. .............................. 378/170; 378/168; 378/205
[58] Field of Search ......................... 378/98.2, 98.8, 378/167, 168, 169, 170, 205

[56] References Cited

U.S. PATENT DOCUMENTS

| | | | |
|---|---|---|---|
| 4,455,670 | 6/1984 | Farrar et al. | 378/170 X |
| 4,554,676 | 11/1985 | Maldonado et al. | 378/170 |
| 4,593,400 | 6/1986 | Mouyen | 378/98.8 |
| 5,179,579 | 1/1993 | Dove et al. | 378/168 X |
| 5,289,522 | 2/1994 | Kanbar et al. | 378/170 |
| 5,327,477 | 7/1994 | Levy | 378/170 X |
| 5,331,166 | 7/1994 | Yamamoto et al. | 378/98.8 X |

*Primary Examiner*—David P. Porta
*Attorney, Agent, or Firm*—Iandiorio & Teska

[57] ABSTRACT

A film positioning system for dental X-ray and digital radiography procedures including a number of film or digital sensor carriers (bite wing, anterior, etc) each including a film or sensor holder on one end and an extending attachment rod, and an X-ray tube aiming device including an attachment rod holder, the attachment rod and the attachment rod holder keyed to correctly align the film holder with respect to an X-ray cone or tube. One example includes a non-equilateral pentagon shaped rod holder receptacle and a non-equilateral pentagon shaped attachment rod.

22 Claims, 4 Drawing Sheets

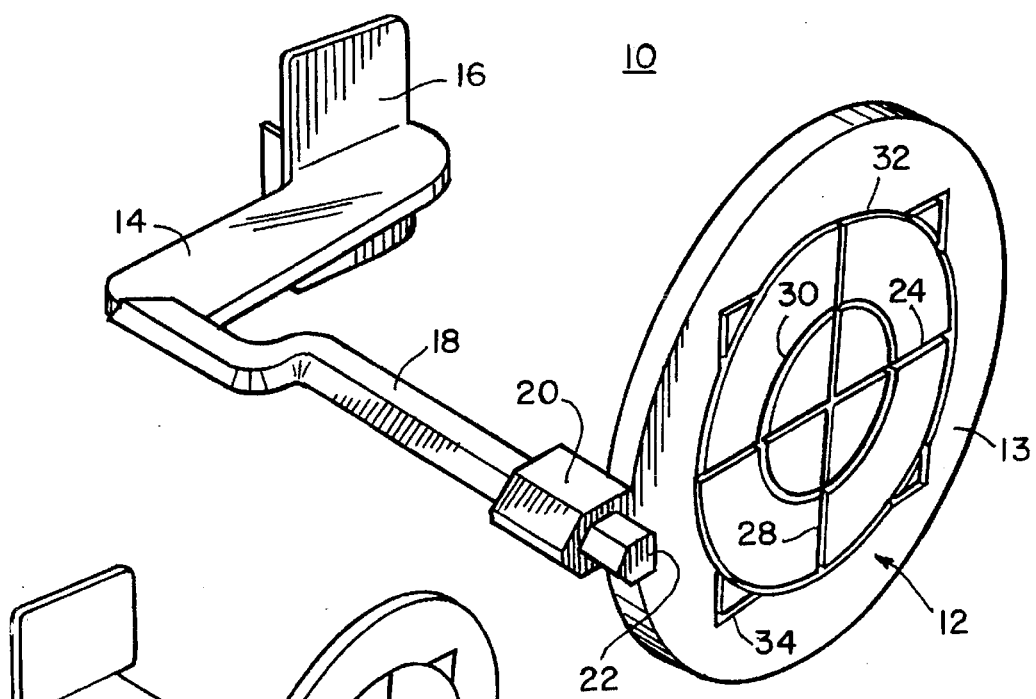
FIG. 1
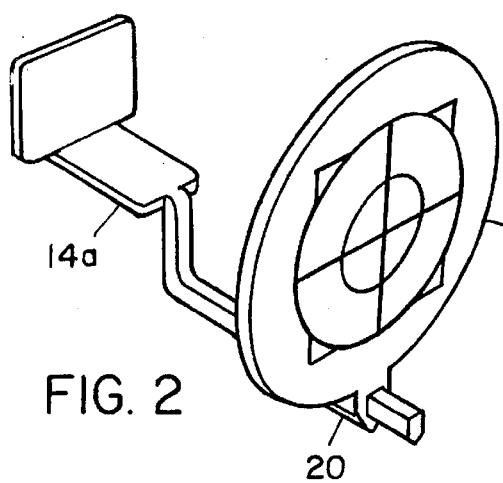
FIG. 2
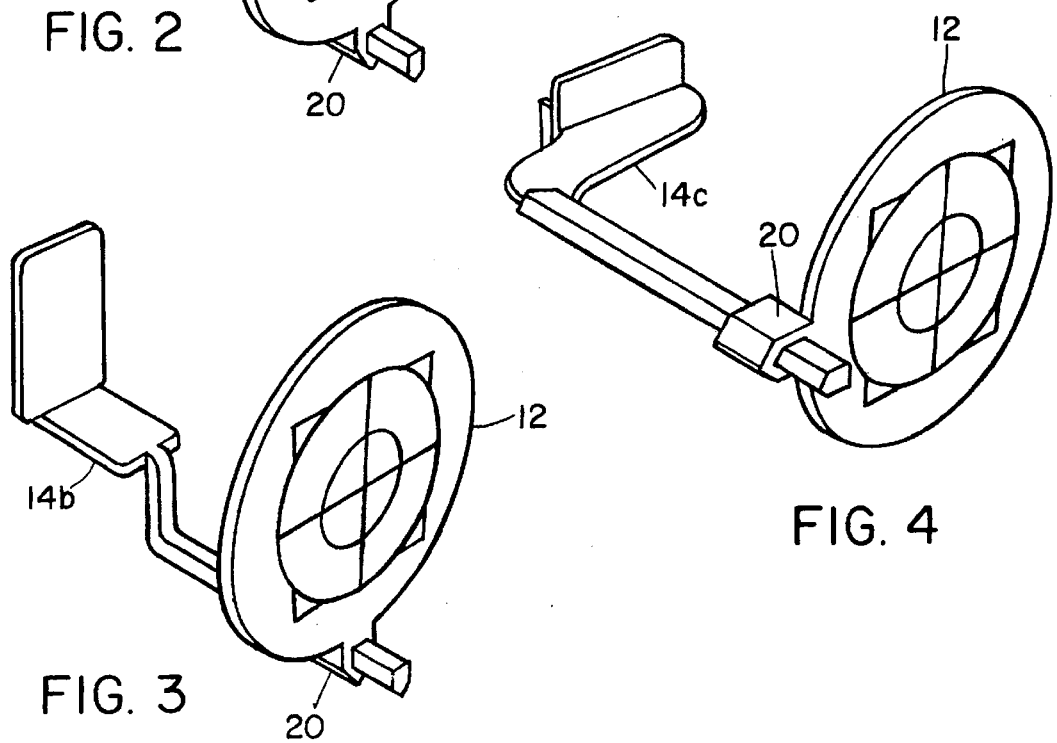
FIG. 3
FIG. 4

FILM POSITIONING SYSTEM FOR DENTAL X-RAY PROCEDURES

FIELD OF INVENTION

This invention relates to a film positioning system for dental X-ray procedures which automatically aligns the X-ray film with respect to the X-ray tube and which eliminates the uncertainty associated with correctly aligning the many different types of X-ray film holders in a patient's mouth.

BACKGROUND OF INVENTION

Dental radiographs are made using X-ray examination units including an X-ray cone or tube positioned proximate the patient and aligned to take X-rays of certain teeth. Dental X-ray films developed for intraoral shots generally have a plate like construction and standardized dimensions so that the film can be introduced into the oral cavity.

In one procedure, the film alone is placed within the patient's mouth and held in place proximate the tooth or teeth to be filmed when the patient closes her mouth over the film. It has been determined, however, the proper orientation of the film with respect to the tooth or teeth to be filmed (for example, parallel to the longitudinal axis of the tooth), is required to eliminate distortions, improper focus and the like.

Therefore, film carriers ("bite blocks") are used which have a back plate for mounting the X-ray film and a bite plate orientated at the right angle to the back plate. The X-ray film is held against the back plate, the film carrier is introduced at the proper location within the patient's mouth, and the patient is instructed to bite down on the bite plate. The film carriers have different shapes depending on the area of the mouth to be filmed, e.g., anterior, vertical bite wing, upper left/lower right or upper right/lower left, and bite wing film carriers.

There is still a need, however, to insure proper orientation of the X-ray tube with respect to the X-ray film mounted against the backplate. The procedure for accomplishing this goal is not always straight forward. The following is an excerpt of a filming procedure using a typical prior art film positioning system disclosed in U.S. Pat. No. 4,949,370, Column 9, line 50—Column 10, line 7:

i. Left upper jaw . . . select mounting face 16b with indicating portion 15b positioned upwardly (inclined); select mounting face 16d with indicating portion 15a positioned upwardly (not inclined).

ii. Left lower jaw . . . select mounting face 16d with indicating portion 15b positioned downwardly (inclined); select mounting face 16b with indicating portion 15a positioned downwardly (not inclined).

iii. Right upper jaw . . . select mounting faced 16d with indicating portion 15b positioned upwardly (inclined); select mounting face 16b with indicating portion 15a positioned upwardly (not inclined).

iv. Left lower jaw . . . select mounting face 16b with indicating portion 15b positioned downwardly (inclined); select mounting face 16d with indicating portion 15a positioned downwardly (not inclined).

v. Front upper jaw . . . select mounting face 16b or 16d with indicating portion 15b positioned upwardly (inclined); select mounting face 16b or 16d with indicating portion 15a positioned upwardly (not inclined).

vi. Front lower jaw . . . select mounting face 16b or 16d with indicating portion 15b positioned downwardly (inclined); select mounting face 16b or 16d with indicating portion 15a positioned downwardly (not inclined).

One inventor of the instant invention greatly simplified this difficult to understand prior art procedure by engineering the device depicted in U.S. Pat. No. 5,327,477 incorporated herein by reference. In that patent there are three rod holders each annotated to match a specific film holder.

In the instant invention, the inventors have devised an even simpler system.

SUMMARY OF INVENTION I

It is therefore an object of this invention to provide a film positioning system for dental X-ray procedures.

It is a further object of this invention to provide such a film positioning system which eliminates the complicated film carrier selection and mounting process associated with prior art film positioning systems.

It is a further object of this invention to provide such a film positioning system which eliminates the uncertainty associated with correctly aligning the many different types of X-ray film holders in a patient's mouth with respect to the X-ray tube.

It is a further object of this invention to provide such a film positioning system which is fool proof in that the film holders can only be inserted into the aiming device only one way.

This invention results from the realization that the uncertainty associated with correctly aligning the many different types of X-ray film holders in a patient's mouth with respect to the X-ray tube can be eliminated if the X-ray tube aiming ring has a rod holder with a particular geometric shape (e.g. a non-equilateral pentagon or a non-equilateral triangle) and if the film holder rods are manufactured to have this same geometric shape. In that way, it is self evident to the X-ray technician how the aiming ring must be orientated on the X-ray tube. The preferred shapes of the rod holders and rods are those shapes with, at best, only one axis of symmetry.

A non-equilateral pentagon "house" shaped block will only fit into a non-equilateral pentagon "house" shaped hole one way—the correct way. The same is true for a non-equilateral triangle. Although not limited to a non-equilateral pentagon or even standard geometric shapes, this invention features film carriers keyed so they only fit in the receptacle of the X-ray aiming device one way—the correct way, thereby eliminating any uncertainty the X-ray technician experiences when faced with correctly orientating anterior, vertical bite wing, upper left/lower right, upper right/lower left and bite wing film carriers in the aiming device. The technician simply selects a film carrier, places it in the patient's mouth, attaches the aiming device to the film carrier, and the aiming device is automatically aligned for placement on or about the X-ray tube.

This invention features a film positioning system for dental X-ray procedures. There are a plurality of film carriers ("bite blocks") each including a film holder on one end and an attachment rod extending therefrom. The unique X-ray tube aiming device includes a single attachment rod holder which is keyed to correctly align the film holder with respect to an X-ray tube. For example, the attachment rod holder includes a body having a receptacle therein, and the attachment rod has a cross sectional shape (e.g. a non-equilateral pentagon) receivable in the said receptacle only one way.

The unique aiming device includes a circumferential aiming ring having a beveled interior surface for releasable engagement of the aiming ring on an X-ray tube. Another aiming device includes a flat aiming plate having a face for receiving an X-ray tube. The face includes the outline of at least one type of X-ray tube thereon and grooves scored in the face of the aiming plate, or printed lines, or even two more outlines of two or more types of X-ray tubes. The face of the aiming plate may also include an aiming cross-hair. Another aiming plate includes an orifice therethrough, the orifice having an interior surface with grooves for receiving the edges of an X-ray tube therein. The interior surface preferably includes a first set of grooves for receiving the edges of a first type of X-ray tube, and a second set of grooves for receiving the edges of a second type of X-ray tube.

This invention also features a film positioning system for dental X-ray procedures comprising a plurality of film carriers each including a film holder on one end and an attachment rod extending therefrom, the attachment rods having a geometric shaped cross section; and an X-ray tube aiming device including at least one attachment rod receptacle, the receptacle having the same geometric shape as the cross section of the attachment rod, the geometric shape such that said attachment rod is received in the receptacle only one way. The invention also works with digital radiography equipment, the difference being that a digital sensor is placed on the carrier instead of X-ray film. In this embodiment, the attachment rod is preferably hollow to receive the lead from the digital sensor connected to the digital radiography equipment.

DISCLOSURE OF PREFERRED EMBODIMENT

Other objects, features and advantages will occur to those skilled in the art from the following description of a preferred embodiment and the accompanying drawings, in which:

FIG. 1 is a perspective view of the film positioning system for dental X-ray procedures according to this invention;

FIG. 2 is a perspective view showing the orientation of the aiming device when an upper left/lower right or upper right/lower left film holder is positioned therein;

FIG. 3 is a perspective view of the system of this invention showing the orientation of the aiming device when an anterior film holder is positioned in the aiming device;

FIG. 4 is a perspective view of the system of this invention when a bite wing film holder is positioned in the aiming device;

Figure 5:
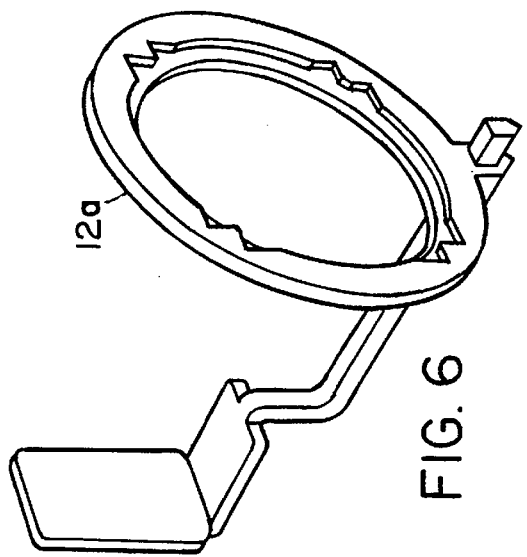
FIGS. 5-8 are similar to FIGS. 2-5 with another for the type of aiming device incorporated as part of the system of this invention.
Figure 6:
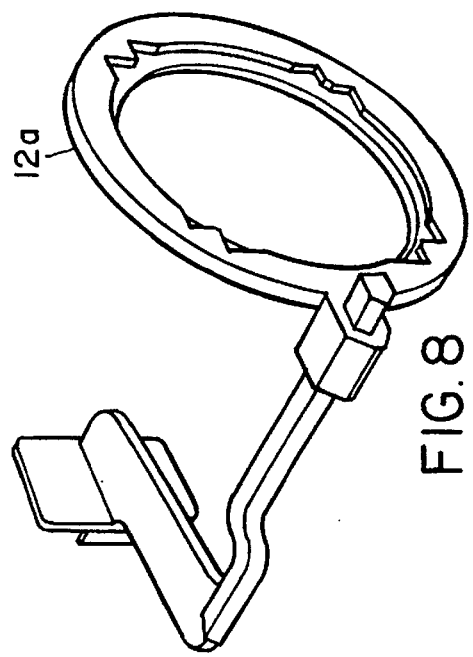
Figure 7:
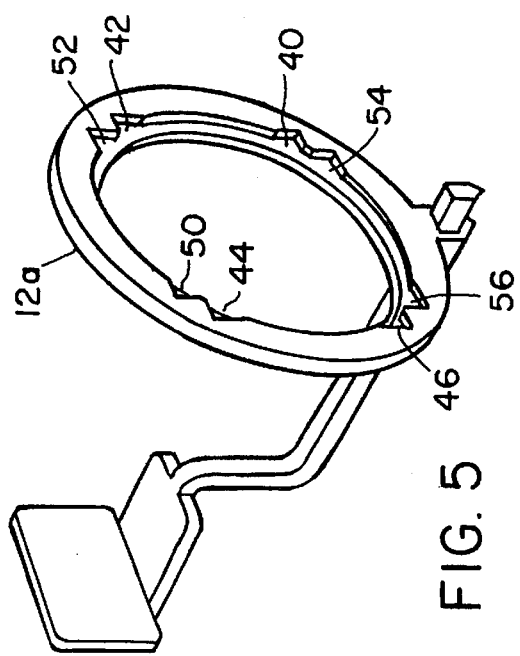
Figure 8:
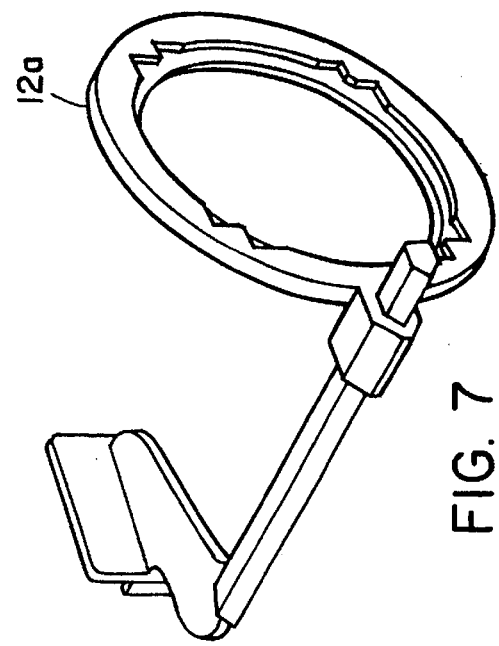

Film positioning system 10, FIG. 1, includes X-ray tube aiming device 12 and a plurality of film carriers such as film carrier 14 (vertical bite wing). Other film carries are shown in FIG. 2 (upper left/lower right or upper right/lower left); FIG. 3 (anterior) and FIG. 4 (bite wing).

Film carrier 14 includes film holder 16 and attachment rod 18 extending therefrom. Attachment rod 18 is received within attachment rod holder 20 of aiming device 12. In this particular embodiment, the attachment rod has a non-equilateral pentagon "house" shaped cross section as shown as 22 and attachment rod holder includes a similar non-equilateral pentagon shaped orifice thereby eliminating any uncertainty associated with correctly aligning film holder 16 in a patient's mouth with respect to an X-ray tube placed up against face 13 of aiming device 12. In this embodiment, aiming device 12 is flat plastic plate which could be transparent. Face 13 of aiming device 12 has cross-hairs 24 and 28 etched therein as well as scored circular grooves 30 and 32 for receiving and/or aligning different diameter circular X-ray tubes. Some X-ray tubes have a square cross section. Groove 34 is used with these types of X-ray tubes. The grooves could instead be printed lines. Additional aiming indicia could be included in order to accommodate other types of X-ray tubes.

In use, the X-ray technician simply places the X-ray film against film holder 16, places film carrier 14 within the patient's mouth, attaches aiming device 12 to film carrier 14 and then brings the aiming tube of the X-ray equipment to bear upon aiming device 12. There is no guess work associated in trying to determine how aiming device 12 is to be positioned on the X-ray tube in order to assure that film carrier 14 is correctly positioned within the patient's mouth.

For example, upper left/lower right or upper right/lower left film carrier 14a, FIG. 2, is automatically positioned with respect to aiming device 12 when attachment rod holder 20 is in the six O'clock position. The same is true for anterior film carrier 14b, FIG. 3. Bite wing film carrier 14c, FIG. 4 and vertical bite wing film carrier 14, FIG. 1, however, are correctly positioned when attachment rod holder 20 is in the nine O'clock position owing to the fact that the attachment rods are keyed so they only fit in the attachment rod holder one way. Although attachment rod holder 20 is configured to have a non-equilateral pentagon shaped opening to receive a non-equilateral pentagon shaped attachment rod, other geometric and non-geometric shapes are possible so long as the attachment rod is keyed to fit in the attachment rod holder only one way.

There are other possible designs for aiming device 12 as well, including aiming ring 12a, FIGS. 6-9, which includes notches 40, 44 and 46 for receiving one type of X-ray tube and notches 48, 50, 52 and 56 for receiving another type of X-ray tube. Round X-ray tubes simply slide within the aiming ring.

Figure 10:
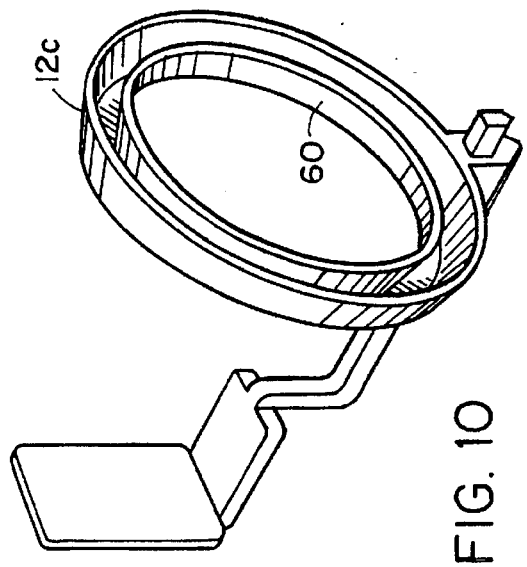
FIGS. 9-12 are perspective views showing another embodiment of the aiming device of the system of this invention.
Figure 12:
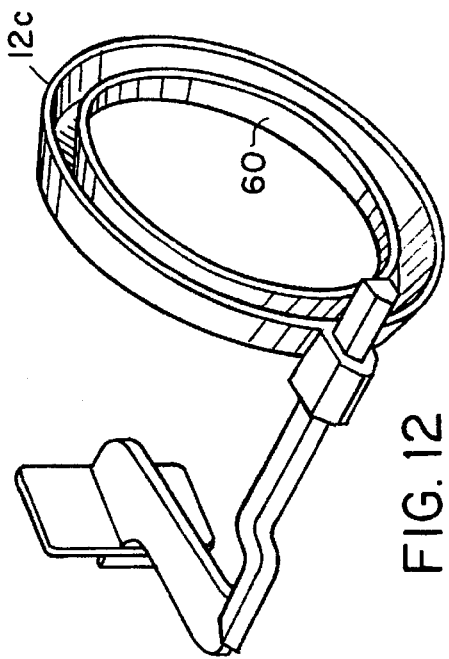
Figure 9:
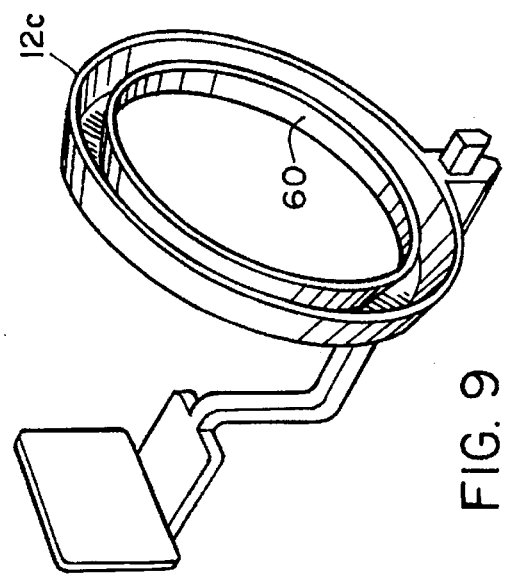
Figure 11:
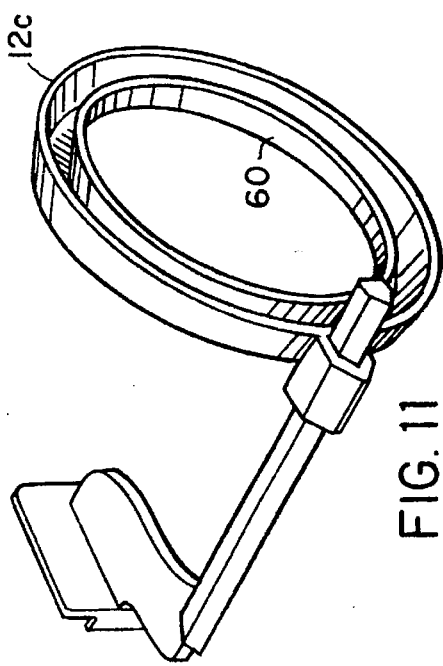
Figure 13:
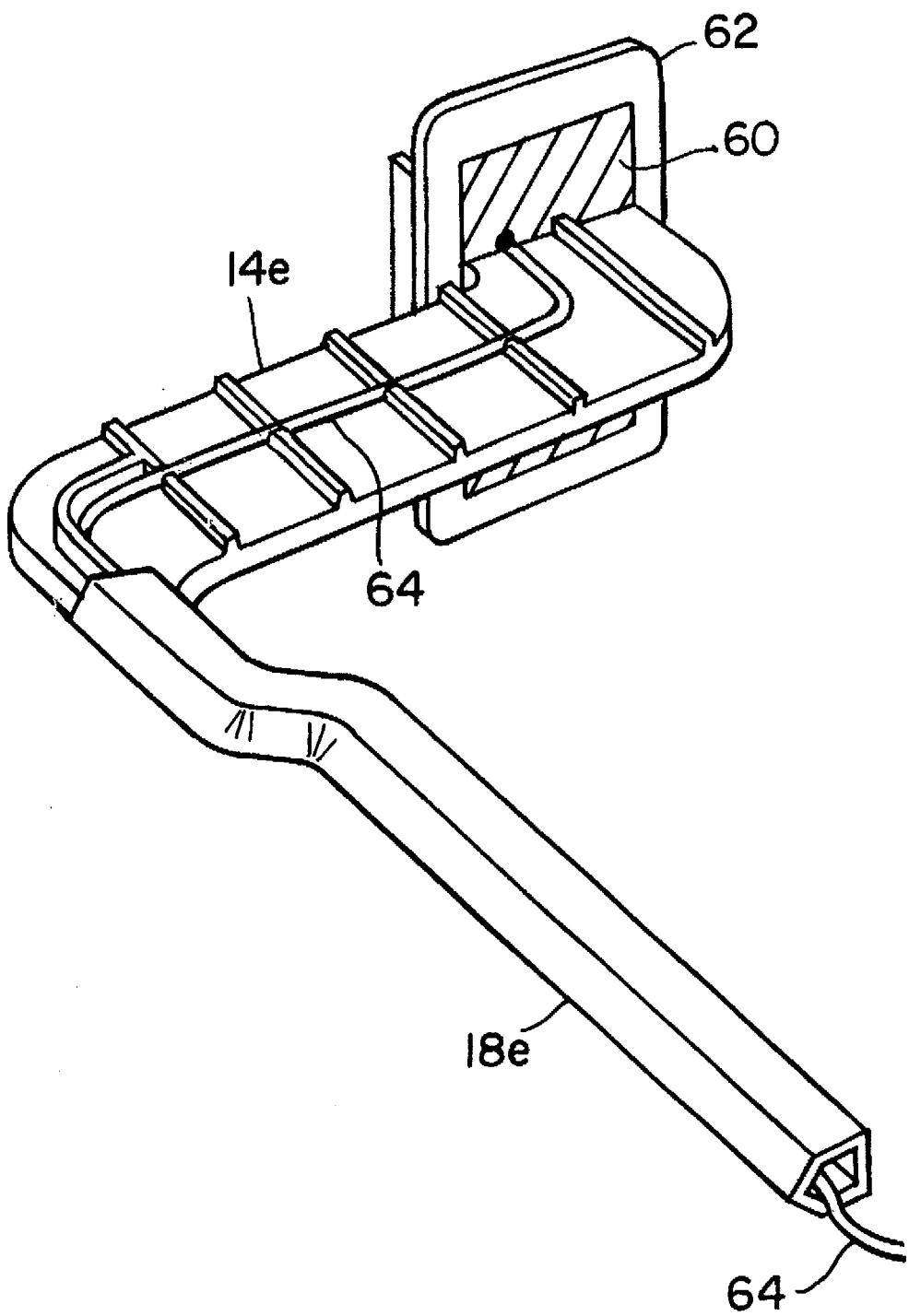
FIG. 13 is a perspective view of another embodiment of the invention useful for digital radiography.

In another embodiment, the aiming device is an aiming ring 12c, FIGS. 10-13 having beveled interior surface 60, FIG. 10 for releasably engaging aiming ring 12c on a circular shaped X-ray tube. Other aiming device configurations, however, are possible and within the scope of the invention. Also, the "bite blocks" used as film holders may be for digital radiography procedures instead of for standard X-ray equipment. The unique aiming device disclosed herein may then be positioned on the digital radiography equipment, the difference being that a digital sensor instead of X-ray film is placed on the bite block. The film carrier 14e, FIG. 13 includes digital sensor 60 mounted on carrier 62. Digital sensor wire 64 then passes through non-equilateral pentagon shaped hollow rod 18e for connection to a computer used in digital radiography procedures.

Therefore, although specific features of the invention are shown in some drawings and not others, this is for convenience only as some feature may be combined with any or all of the other features in accordance with the invention. And, other embodiments will occur to those skilled in the art and are within the following claims:

What is claimed is:

1. A positioning system for dental digital radiography procedures comprising:

a plurality of carriers each including a sensor holder on one end and an attachment rod extending therefrom; said attachment rod having a predefined cross sectional shape with, at most, only one axis of symmetry; and an aiming device including only one attachment rod receptacle, said receptacle having the same shape as said attachment rod, said shape such that said attachment rod is received in said receptacle only one way.

2. The system of claim 1 in which said attachment rod is hollow for receiving a digital sensor lead therethrough.

3. A film positioning system for dental X-ray procedures, comprising:

a plurality of film carriers each including a film holder on one end and an attachment rod extending therefrom, said attachment rod having a non-equilateral pentagon shaped cross section; and an X-ray tube aiming device including at least one attachment rod holder, said attachment rod holder including a body having a non-equilateral pentagon shaped receptacle therein, said attachment rod and said attachment rod holder keyed to correctly align said film holder with respect to an X-ray tube.

4. The system of claim 1 in which said aiming device includes a circumferential aiming ring having a beveled interior surface for releasable engagement of said aiming ring on an X-ray tube.

5. The system of claim 1 in which said aiming device includes a flat aiming plate having a face for receiving an X-ray tube.

6. The system to of claim 5 in which said face includes the outline of at least one type of X-ray tube thereon.

7. The system of claim 6 in which said outline includes grooves scored in the face of said aiming plate.

8. The system of claim 6 in which said outline includes printed lines.

9. The system of claim 6 in which the face of said aiming plate includes two or more outlines of two of more types of X-ray tubes thereon.

10. The system of claim 5 in which the face of said aiming plate includes an aiming cross-hair thereon.

11. The system of claim 5 in which said aiming plate includes an orifice therethrough, said orifice having an interior surface with grooves for receiving the edges of an X-ray tube therein.

12. The system of claim 11 in which said interior surface includes a first set of grooves for receiving the edges of a first type of X-ray tube, and a second set of grooves for receiving the edges of a second type of X-ray tube.

13. A film positioning system for dental X-ray procedures, comprising:

a plurality of film carriers each including a film holder on one end and an attachment rod extending therefrom having a cross sectional shape with only one axis of symmetry; and an X-ray tube aiming device comprising a single attachment rod holder including a body having only one receptacle therein with the same shape as the attachment rod such that said attachment rod is receivable in said receptacle only one way.

14. A film positioning system for dental X-ray procedures comprising:

a plurality of film carriers each including a film holder on one end and an attachment rod extending therefrom, said attachment rod having a geometric shaped cross section; and an X-ray tube aiming device including at least one attachment rod receptacle, said receptacle having the same geometric shape as the cross section of the attachment rod, said geometric shape such that said attachment rod is received in said receptacle only one way; said geometric shape being a non-equilateral pentagon.

15. The system of claim 14 in which said aiming device includes a flat aiming plate having a face for receiving an X-ray tube.

16. The system of claim 15 in which said face includes the outline of at least one type of X-ray tube thereon.

17. The system of claim 16 in which said outline incudes grooves scored in the face of said aiming plate.

18. The system of claim 16 in which said outline includes printed lines.

19. The system of claim 16 in which the face of said aiming plate includes two or more outlines of two of more types of X-ray tubes thereon.

20. The system of claim 15 in which the face of said aiming plate includes an aiming cross-hair thereon.

21. The system of claim 15 in which said aiming plate includes an orifice therethrough, said orifice having an interior surface with grooves for receiving the edges of an X-ray tube therein.

22. The system of claim 21 in which said interior surface includes a first set of grooves for receiving the edges of a first type of X-ray tube, and a second set of grooves for receiving the edges of a second type set of X-ray tube.

* * * * *